2,809,952

ENCAPSULATING AND COATING COMPOSITION AND PRODUCTS TREATED THEREWITH

Harry B. Bolson, Fort Wayne, Ind., assignor to General Electric Company, a corporation of New York No Drawing. Application June 10, 1955, Serial No. 514,765

6 Claims. (Cl. 260—40)

This invention is concerned with coating and encapsulating compositions of a heat-polymerizable type and electrical equipment treated therewith. More particularly, the invention relates to an encapsulating and coating composition comprising, by weight, (1) from 18 to 25% of a complex epoxide resin comprising a polyether derivative of a polyhydric organic compound, e. g., a polyhydric alcohol or phenol, containing epoxy groups, obtained by reacting an epihalogenohydrin, for example, epichlorohydrin, with a polyhydric organic compound, (2) from 18 to 25% of an adduct of maleic anhydride and hexachlorocyclopentadiene, and (3) from 55 to 64% of a mixture of ingredients comprising, by weight, (a) 1 part of a vinyl aromatic compound selected from the class consisting of vinyl toluene and styrene, and (b) from 0.8 to 1.4 parts of an unsaturated polyester, specifically a propylene glycol adipate maleate, there being incorporated in the aforesaid encapsulating and coating composition a mixture of discrete mica particles composed of finely divided mica and mica of coarser grain size. The invention also includes various types of electrical equipment, for instance, coils, transformers, stators, etc., coated or encapsulated with the aforesaid mixture of ingredients.

Considerable difficulty has been encountered in the application of polymerizable materials for coating and encapsulating electrical members, such as windings, coils, cores and the like, whereby penetration of the members is readily secured, and polymerization of the treating composition into a thermoset solid body occurs without evolution of water, gases, or other undesirable products to yield insulated assemblies which have good resistance to moisture and can stand wide ranges of thermal shocks. Another requirement for such insulated electrical members is that under high humidity conditions, the insulation resistance of the electrical member be substantially unchanged and remain at a high level.

Various methods in the past have been suggested for coating and encapsulating (for brevity, such treatment will hereinafter be referred to as "encapsulating") various electrical members to yield, upon heat treatment, insulated articles having the desired humidity resistance, and thermal shock resistance, as well as other properties mentioned above. One type of composition suggested for this purpose is ethoxyline resins cured in the presence of curing catalysts used for the purpose. However, these have not proved satisfactory because, although they often pass the requirements for humidity resistance, they were unable to withstand the thermal shock specifications. The use of presently known polyester resins, i. e., reaction products of a polyhydric alcohol and an alpha unsaturated alpha, beta dicarboxylic acid or anhydride, for instance, diethylene glycol maleate, dipropylene glycol maleate, etc., either alone or in combination with other copolymerizable materials such as styrene, diallyl phthalate, etc., has not been acceptable because electrical members insulated with such polyester resins have failed not only the thermal shock test but also the humidity test. Various waxes, for instance, microcrystalline waxes, have been suggested for encapsulating purposes but, although some of them passed the thermal shock test, they failed the humidity test because of the inability of the wax to adhere to metallic surfaces and terminals. Simple varnish treatments, for instance, treatment of the electrical members with phenol-aldehyde varnishes, etc., again have been unsatisfactory because the moisture resistance of the insulated electrical member has been poor because of the permeability of the film.

Accordingly, it can be readily seen that up to the present time, materials ordinarily used for encapsulating and coating purposes have not been satisfactory for meeting two prime requirements of electrical members, especially for satisfying the rigid specifications set up by the military authorities for electrical equipment furnished to the latter, as regards insulation resistance in high humidity and moisture environments, and the ability to withstand thermal shock under the variety of conditions called for in these military specifications.

I have now discovered that I can obtain encapsulation and coating of electrical parts, such as inductive devices, e. g., control transformers, by employing as the encapsulating or coating material a mixture of ingredients comprising (1) a complex epoxide resin (hereinafter referred to as "ethoxyline resin") described above, (2) an adduct of maleic anhydride and hexachlorocyclopentadiene, (3) a polymerizable mixture of propylene glycol maleate adipate and a vinyl benzene selected from the class consisting of styrene and vinyl toluene, and (4) a mixture of discrete mica particles of two different particle sizes, one being finely divided mica and the other being of a coarser grade of mica, the ingredients used for encapsulating and coating surfaces being in certain critical proportions as described above.

The ethoxyline resins defined above as being a complex epoxide resin comprising a polyether derivative of a polyhydric organic compound, e. g., polyhydric alcohol or phenol, containing epoxy groups are disclosed in various places in the art. Among such references may be mentioned Castan Patent 2,324,483, as well as Castan Patent 2,444,333, British Patent 518,057, and British Patent 579,698. For the most part, these ethoxyline resins are based on the resinous product of reaction between an epihalogenohydrin, for instance, epichlorohydrin, and a phenol having at least two phenolic hydroxy groups, for example, bis-(4-hydroxyphenyl)-dimethylmethane. U. S. Patents 2,494,295; 2,500,600 and 2,511,913 describe other examples of ethoxyline resinous compositions which may be employed in the practice of the present invention. By reference, the aforementioned patents are intended to be included as part of the present description of the ethoxyline resins used and, for brevity, the ethoxyline will not be described other than that they contain more than one ethylene oxide groups, e. g., from 1 to 2 or more epoxide groups per molecule and may be prepared by effecting reaction between a polyhydroxy phenol or alcohol, for example, hydroquinone, resorcinol, phenol or alcohol, for example, hydroquinone, resorcinol, glycerine, or condensation products of phenols with ketones, for instance, bis-(4-di-hydroxydiphenyl)-2,2-propane, with epichlorohydrin. For example, the reaction of epichlorohydrin with bis-(4-hydroxyphenyl)-2,2-propane may be formulated as follows:

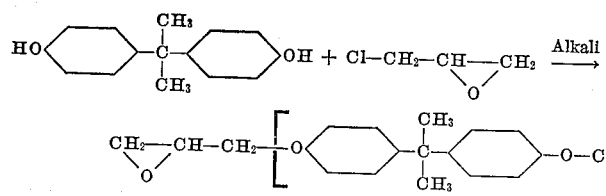

where $n$ has an average value varying from around zero to about 7. Many of these ethoxyline resins are sold under the name of Epon resins by Shell Chemical Corporation or Araldite resins by the Ciba Company. Data on the Epon resins are given in the table below:

TABLE I

| Epon No. | Epoxide Equivalent | Approximate Esterification Equivalent | M. P., °C. | Hydroxyl Equivalent |
| --- | --- | --- | --- | --- |
| 834 | 225–290 | 105 | 20–28 | 475–715 |
| 828 | 192 | 80 | 9 | 1,250 |
| 864 | 300–375 | 105 | 40–45 | 385 |
| 562 | 140–165 | 60 | Liquid | 400 |
| 1004 | 870–1,025 | 175 | 95–105 | 294 |
| 1007 | 1,550–2,000 | 190 | 127–133 | 278 |
| 1009 | 2,400–4,000 | 200 | 145–155 | 250 |
| 1001 | 450–525 | 130 | 64–76 | 312 |

The complex epoxides used with the above-described ingredients contain epoxide groups or epoxide and hydroxyl groups as their functional groups and are generally free from other functional groups such as basic and acidic groups.

The adduct (obtained by a Diels-Alder condensation) of maleic anhydride and hexachlorocyclopentadiene (said adduct hereinafter referred to as "chlorinated maleic adduct") is also called hexachloroendomethylenetetrahydrophthalic anhydride and has the formula

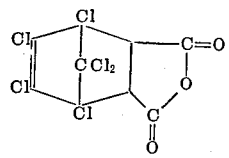

This chlorinated maleic adduct is more particularly described in U. S. Patent 2,606,910, issued August 12, 1952.

In employing the chlorinated maleic adduct and ethoxyline resin in the preparation of the above-described encapsulating compositions, I prefer to use the latter two ingredients in such proportions that there is present in the mixture of the latter two materials from about 0.8 to 1.2 equivalents of the chlorinated maleic adduct for each equivalent of epoxide in the ethoxyline resin.

The propylene glycol adipate maleate can be obtained by interacting under the influence of heat 30–40 parts propylene glycol, 50–60 parts adipic acid, and 1–5 parts maleic anhydride in the usual manner employed for making unsaturated polyesters, as, e. g., is more particularly described in Patents 2,443,737–741, issued June 22, 1948. The vinyl aryl compound and the propylene glycol adipate maleate are preferably within the range of from about 0.8 to 1.4 parts of the propylene glycol adipate maleate per part of the vinyl aryl compound.

The discrete particles of mica employed must be in the form of a mixture of finely divided mica and coarser particles of mica. In general, we have found that the fine mica should be fine enough so that from 95 to 100% go through a 200 to 325 mesh screen of the U. S. Sieve series, which means that the particles in the finer mica mass have an average particle size diameter of from about 0.04 to 0.075 mm. The coarser particles of mica (about 95 to 100% of the particles) advantageously are capable of passing through a 25-mesh screen of U. S. Sieve series, up through about a 140-mesh screen, which would make the average particle size of these mica particles range from about 0.1 mm. to about 0.75 mm. In general, I have found that equal parts of the coarse mica and finely ground mica are advantageously employed. However, the proportions of the finely ground mica and the coarse mica may be varied within the range of from about 0.75 part to 3 parts of the finely ground mica per part of the coarser mica particles. The mica is essential in the practice of the present invention in making the above-described encapsulating compositions if one is to obtain the favorable thermal shock properties. The use of other fillers in place of the mica will not give the desired thermal shock properties.

As an additional critical feature of the present invention, it is required that the ingredients used as the binder for the mica, namely, the heat curable encapsulating and coating composition be employed within the ranges recited above. Attempts to use these materials, for instance the complex epoxide resin, the vinyl aryl derivative, and the chlorinated maleic adduct, outside these ranges again will not give the desired properties and the resulting cured material will be deficient in one or all of the requirements, as far as moisture resistance, thermal shock resistance, and salt spray resistance are concerned.

A formulation including the above ingredients and mica particles comprises the following:

| Ingredients: | Parts by weight, percent |
| --- | --- |
| Ethoxyline resin | 10 to 15 |
| Adduct of maleic anhydride and hexachlorocyclopentadiene | 10 to 15 |
| Mixture of styrene and propylene glycol adipate maleate | 35 to 40 |
| Finely divided mica | 15 to 20 |
| Coarse particle mica | 15 to 20 |

To the above is usually added from 1 to 3% silica aerogel for thickening purposes as well as a small amount, for instance, from 0.1 to 1.5%, by weight (based on the weight of the encapsulating compound) of a curing agent such as benzoyl peroxide.

The technique for making the encapsulating composition preferably encompasses a certain procedure. The mica fillers are added to the resinous mixture composed of the ethoxyline resin, the chlorinated maleic adduct, the propylene glycol maleate adipate, and the vinyl aryl compound, which latter four ingredients have been previously intimately intermixed with each other. The incorporation of the fillers in the base resin is advantageously carried out on a three-roll paint mill which is cooled to about 15° to 30° C. to minimize interaction between the chlorinated maleic adduct and the ethoxyline resin. It is generally desirable to effect the dispersion of the filler in the base resin by adjusting the rolls of the paint mill to achieve a viscosity of about 10,000 to 20,000 centipoises at about 25 to 30° C. Just before the encapsulating composition is employed, a sufficient amount of styrene is added to replace that which may have been lost in the milling, and also to obtain a viscosity of about 20,000 to 40,000 centipoises at 25° C. Thereafter, a vinyl polymerization catalyst for the vinyl aryl compound, such as benzoyl peroxide, tertiary butyl hydroperoxide, dicumyl peroxide, tertiary butyl perbenzoate, etc., is added to the mixture in a catalytic amount.

The treatment of various electrical equipment, such as transformers, conductors, other electrical coils, motor stators, etc., is accomplished by methods known in the art.

A preferred method, especially when applied to transformers, comprises preheating the transformer (which has advantageously been varnish-coated and cured in the normal manner) at a temperature of about 100 to 150° C. for at least 1 to 2 hours, dipping the feet of the transformer up slowly in the encapsulating resin and withdrawing it at a slow rate, for instance at a rate of about 2 to 6 inches per minute (the terminals and feet previously having been masked), reversing so that the feet face downward, and covering any openings in the transformer with the encapsulating resin, removing the transformer and allowing it to remain for a few minutes at room temperature, and thereafter placing it in an oven at a temperature of about 100 to 150° C. for about 15 to 30 minutes to effect curing to the thermoset stage of the encapsulating and coating resin. This treatment of the transformer is advantageously repeated twice more, and thereafter the entire assembly is given a final oven bake at a temperature of about 150 to 175° C. for a period of about 1 to 2 hours. It will be found that transformers treated in this manner will have outstanding resistance to moisture and salt spray, as well as having outstanding thermal shock properties. Transformers treated in this manner have passed military specification MIL E5272A and MIL T-27 Grade 1 specifications for electrical equipment of this type.

Obviously, other techniques may be employed in preparing both the encapsulating and coating material, as well as treated electrical apparatus. In general, the particular application for which the encapsulating compound is designed will recommend modifications and variations in the above technique.

In order that those skilled in the art may better understand how the present invention may be practiced, the following example is given by way of illustration and not by way of limitation. All parts are by weight.

The unsaturated polyester comprising the propylene glycol maleate adipate employed in the following example was prepared as follows:

On a weight basis, about 36 parts propylene glycol, 3 parts maleic anhydride and 57 parts adipic acid were mixed together in the presence of a fraction of a weight percent phosphoric acid and in the presence of a polymerization inhibitor, specifically, tertiary-butyl catechol. The mixture of ingredients was heated with stirring at about 200–250° C. for about 10 to 12 hours while continuously removing the water of esterification. The unsaturated polyester product thus obtained was a viscous liquid having an acid number of from 9 to 13.

Example 1

An encapsulating composition was prepared from the following ingredients which were present in the stipulated percents, by weight:

| Ingredients: | Percent by weight |
|---|---|
| Mixture by weight of 45 parts styrene and 55 parts propylene glycol maleate adipate (described above) | 37.4 |
| 828 Epon resin (more particularly described in Table I and in the equation above) | 13.3 |
| Chlorinated maleic adduct | 13.3 |
| Finely divided mica particles of about 325 mesh | 17.0 |
| Coarse mica particles of about 100 mesh | 17.0 |
| Silica aerogel (Santocel C obtained from Monsanto Chemical Company) used as bodying agent | 2.0 |
| Quinone (inhibitor) | 0.005 |

The chlorinated maleic adduct was dissolved in the mixture of styrene and the maleate adipate, and the ethoxyline resin RN-828 Epon was added with stirring. Thereafter all fillers were thoroughly dispersed in the resin mixture and then transferred to a three-roll paint mill to effect a more intimate dispersion of the filler in the resin base. About 0.5%, by weight, based on the total weight of the ingredients, of benzoyl peroxide was added and sufficient styrene (only added if necessary, usually requiring less than 5 weight percent) was added to adjust the working viscosity of the mixture of ingredients to about 40,000 to 60,000 centipoises at 25° C. However, further experimentation has shown that, while this viscosity is in the preferred range, the benefits of the invention can be obtained with working viscosities from 10,000 to 100,000 centipoises at 25° C. The mixture of ingredients was thereafter deaerated to remove substantially all entrapped air present in the encapsulating and coating composition.

A small transformer assembly comprising a coil composed of enameled wire and a paper wrapping associated with a wound core was treated as follows with the above-described mixture of ingredients comprising the styrene-maleate adipate mixture, the ethoxyline resin, the chlorinated maleic adduct, and the mixture of mica fillers and benzoyl peroxide. The transformer was preheated to about 125° C., and then dipped into the encapsulating material which was maintained at about 25° to 30° C. (to prevent undesirable advancement or gelation of the resin). The transformer was withdrawn from the treating mixture at a constant rate of about 4 inches per minute. The coating on the transformer was then gelled by heating in a 125° C. oven and then redipped in the encapsulating coating composition as described above, but reversing the transformer so that any drainage would flow toward the mounting feet of the transformer. Again, the treated transformer was gelled at 125° C. in a reverse position, and thereafter the coating was cured for 1 hour at 150° C. Several transformers were treated in this manner.

The treated transformers were then subjected to various tests including (1) salt spray resistance (specification QQ-M-151A) in which units are exposed for 50 hours to a salt fog obtained from a solution of 20% sodium chloride and distilled water while the test chamber is maintained at about 90–95° F.; (2) thermal shock resistance (specification MIL E5272A) where units are subjected to one cycle of one hour at −55° C., then immediately placed into a +65° C. environment for 1 hour; and (3) a test for humidity resistance (specification MIL E5272A, humidity test—Procedure I) where units are placed in a test cabinet at 20° to 38° C., and during the first two hours of test, the temperature is increased to 71° C., and thereafter a temperature of 71° C. and a relative humidity of 95% is maintained during the next 6 hours, and finally, the temperature is reduced to 20–38° C. during the next 16 hours. The above cycle for humidity resistance constituted one cycle. Five humidity cycles were carried out. As a result of these tests, it was found that 48 transformers treated in the above fashion for thermal shock resistance tests had an insulation resistance in megohms, before the test of from 18,000 to 20,000, and this insulation resistance was maintained at the same level after the thermal shock resistance test. In addition, the condition of the sample, particularly the condition of the coating and encapsulating material was excellent and there was no evidence of any cracks.

With regard to the salt spray resistance test, whereas the insulation resistance intially was about 20,000 megohms, after 50 hours in the salt spray test the resistance after four cycles was still of the order of about 18,000 to 20,000 megohms, and even after six cycles was of the order of about 12,000 to 14,000 megohms.

Immersion of the encapsulated transformers in water showed that after 24 hours, the percent water absorption as percent weight increase of water was about 0.10%, and after 4 weeks had risen only to about 0.56% water absorption as percent weight increase. The oil resistance of the encapsulated transformers was excellent, as evidenced by the fact that no visible change in the condition or appearance of the treated transformer could be noted after many days total immersion in such materials as a 50/50 weight mixture of naphtha and #10 Transil Oil, a 50/50 weight mixture of naphtha and spindle oil, a mixture of Stanolex diesel fuel oil #2, and in Alnonia grease #2, which is a hydrocarbon oil grease.

One of the significant results in using the above-described compositions for encapsulating and coating electrical members, for instance transformers, is the outstanding insulation resistance maintained after tests in the humidity cycling. Specification MIL T-27 Grade 1 moisture cycling requires an insulation resistance reading in excess of 1000 megohms, 24 hours after one cycle in the humidity chamber. The transformers treated in accordance with the above procedure showed an insulation resistance after 6 cycles within the range of about 4000 to 8000 megohms.

The humidity resistance of transformers treated in accordance with the practice of the present invention should be contrasted with transformers which had been encapsulated with other compositions hereinbefore employed for similar purposes. In one instance, transformers had been treated similarly as above with a mixture of diallyl phthalate, diethylene glycol maleate, a polyvinyl formal resin (Formvar), employing a vinyl polymerization organic compound as catalyst. The insulation resistance after the first cycle was of the order of about 6 to 8 megohms, and in no event did it rise above 28 megohms after 4 cycles.

A transformer treated similarly as above with a mixture of diallyl phthalate, diethylene glycol maleate, and an ethoxyline resin containing an organic amine hardener, specifically Randac 4052 sold by the Mitchell Rand Corporation showed an insulation resistance after about 4 cycles within the range of from about 3 to 45 megohms.

Finally, a transformer treated similarly as above with another polyester mixture comprising an oil-modified unsaturated polyester composed of a polyhydric alcohol and maleic acid ester, and a copolymerizable liquid monomer such as styrene (known as "Fosterite" manufactured by Westinghouse Electric Corporation), when tested under similar conditions showed an insulation resistance within a range of about 30 to 500 megohms and, for the most part, the insulation resistance was within the range of about 220 to 350 megohms.

It will, of course, be apparent to those skilled in the art that other ethoxyline resins, many examples of which have been given above, as well as the other vinyl aryl compounds, namely, a vinyl toluene, may be employed in place of the analogous ingredients used in the above-identified example. Modifications of the propylene glycol maleate adipate may also be used. Varying proportions within the ranges described above may be used in place of those specifically recited in the examples herein described. Variations in the method of preparing the encapsulating composition, as well as different size mica particles and variations in the method for encapsulating or coating, may be resorted to without departing from the scope of the invention.

The resinous composition containing the mica fillers adheres readily to various metals such as copper, aluminum, nickel and the like, so that water will not penetrate between the resin and the metal. The coated metal may be flexed without separation of the resin therefrom. Field coils treated with the above-described encapsulating mixture may be handled and bent severely as is required during installation of the coils without cracking or other undesirable results.

A valuable feature of the above-described encapsulating or coating material as compared to other types of varnishes and resins resides in the fact that at temperatures at which electrical equipment employing these materials will operate, corrosive acids are ordinarily not given off as do many varnishes employed for wire enamels, tape impregnants, and the like which have caused corrosion of the metal with which the resins have been associated. Thermoset resinous products of this invention can be safely employed at elevated temperatures in contact with corrosion-sensitive metals, such as iron, steel, aluminum and the like.

The incorporation of other additives, such as flame-retardants (e. g., chlorinated and fluorinated organic compounds such as hexachlorodiphenyl, tetrachlorodifluoroethane, chlorinated diphenyl oxide, etc.), as well as pigments, etc., is not precluded where applications recommend such addition.

In addition to the uses described above, conductors may be insulated by passing the conductor through the above-described mixture of ingredients, and heat treated to obtain products having good insulation resistance as well as good moisture resistance.

In addition to the use of the encapsulating composition described above for dipping or coating applications, it will also be apparent to those skilled in the art that casting of electrical assemblies in the encapsulating resinous mixture may also take place. Thus, the electrical assembly may be placed in a mold and the encapsulating resinous mixture added in an amount sufficient to encase the electrical equipment to the desired extent, any trapped air evacuated by suitable means to reduce or eliminate the presence of voids caused by such air entrapment, and thereafter heat is applied to effect conversion of the encapsulating resin to the cured, solid state.

What I claim as new and desire to secure by Letters Patent of the United States is:

1. A heat-curable, encapsulating composition comprising, by weight, (1) from 18 to 25 percent of a complex epoxide resin containing epoxy groups and comprising a polyether derivative obtained by reacting an epihalogenohydrin with a polyhydric organic compound, (2) from 18 to 25 percent of an adduct of maleic anhydride and hexachlorocyclopentadiene, and (3) from 55 to 64 percent of a mixture of ingredients comprising, by weight, from 0.8 to 1.4 parts propylene glycol adipate maleate to 1 part of a vinyl aryl derivative selected from the class consisting of styrene and vinyl toluene, there being incorporated in the aforesaid encapsulating composition a mixture of discrete mica particles comprising by weight from 0.75 to 3 parts of mica particles having an average diameter of the order of 0.04 mm. to 0.075 mm. to each part of mica particles having an average diameter of the order of 0.1 mm. to 0.75 mm.

2. An encapsulating composition for electrical equipment curable in the presence of heat and a vinyl polymerization catalyst comprising, by weight, (1) from 18 to 25 percent of a complex epoxide resin containing epoxy groups and comprising a polyether derivative obtained by reacting epichlorohydrin with di-(hydroxyphenyl)-dimetheylmethane, (2) from 18 to 25 percent of an adduct of maleic anhydride and hexachlorocyclopentadiene, and (3) from 55 to 64 percent of a mixture of ingredients comprising, by weight, from 0.8 to 1.4 parts propylene glycol adipate maleate to 1 part styrene, there being incorporated in the aforesaid encapsulating composition a filler comprising a mixture of mica particles comprising by weight from 0.75 to 3 parts of mica particles having an average diameter of the order of 0.04 mm. to 0.075 mm. to each part of mica particles having an average diameter of the order of 0.1 mm. to 0.75 mm.

3. An encapsulating composition for electrical equipment curable in the presence of heat and a vinyl polymerization catalyst comprising, by weight, (1) from 18 to 25 percent of a complex epoxide resin containing epoxy groups and comprising a polyether derivative obtained by reacting epichlorohydrin with di-(hydroxyphenyl)-dimethylmethane, (2) from 18 to 25 percent of an adduct of maleic anhydride and hexachlorocyclopentadiene, and (3) from 55 to 64 percent of a mixture of ingredients comprising, by weight, from 0.8 to 1.4 parts propylene glycol adipate maleate to 1 part vinyl toluene, there being incorporated in the aforesaid encapsulating composition a filler comprising a mixture of mica particles comprising by weight from 0.75 to 3 parts of mica particles having an average diameter of the order of 0.04 mm. to 0.075 mm. to each part of mica particles having an average diameter of the order of 0.1 mm. to 0.75 mm.

4. An encapsulating composition for electrical equipment curable in the presence of heat comprising, by weight, (1) about 13.3 percent of a complex epoxide resin containing epoxy groups and comprising a polyether derivative obtained by reacting epichlorohydrin with di-(hydroxyphenyl)-dimethylmethane, (2) about 13.3 percent of an adduct of maleic anhydride and hexachloropentadiene, (3) about 37.4 percent of a mixture of ingredients comprising, by weight, (a) about 45 parts styrene and (b) 55 parts propylene glycol adipate maleate, (4) about 34 percent of a mixture of particles of mica comprising by weight from 0.75 to 3 parts of mica particles having an average diameter of the order of 0.04 mm. to 0.075 mm. to each part of mica particles having an average diameter of the order of 0.1 mm. to 0.75 mm., the balance of the encapsulating composition being composed of small amounts of silica aerogel, a room temperature inhibitor for the styrene and propylene glycol adipate maleate consisting of quinone, and a vinyl polymerization catalyst.

5. A motor stator coated and impregnated with an insulating composition comprising, by weight, (1) from 18 to 25 percent of a complex epoxide resin containing epoxy groups and comprising a polyether derivative obtained by reacting an epihalogenohydrin with a polyhydric organic compound, (2) from 18 to 25 percent of an adduct of maleic anhydride and hexachlorocyclopentadiene, and (3) from 55 to 64 percent of a mixture of ingredients comprising, by weight, from 0.8 to 1.4 parts propylene glycol adipate maleate to 1 part of a vinyl aryl derivative selected from the class consisting of styrene and vinyl toluene, there being incorporated in the aforesaid encapsulating composition a mixture of discrete mica particles comprising by weight from 0.75 to 3 parts of mica particles having an average diameter of the order of 0.04 mm. to 0.075 mm. to each part of mica particles having an average diameter of the order of 0.1 mm. to 0.75 mm., said composition having been cured in the presence of heat and a vinyl polymerization catalyst.

6. A transformer coated and impregnated with an insulating composition comprising, by weight, (1) from 18 to 25 percent of a complex epoxide resin containing epoxy groups and comprising a polyether derivative obtained by reacting epichlorohydrin with di-(hydroxyphenyl)-dimethylmethane, (2) from 18 to 25 percent of an adduct of maleic anhydride and hexachlorocyclopentadiene, and (3) from 55 to 64 percent of a mixture of ingredients comprising, by weight, from 0.8 to 1.4 parts propylene glycol adipate maleate to 1 part vinyl toluene, there being incorporated in the aforesaid encapsulating composition a filler comprising a mixture of mica particles comprising by weight from 0.75 to 3 parts of mica particles having an average diameter of the order of 0.04 mm. to 0.075 mm. to each part of mica particles having an average diameter of the order of 0.1 mm. to 0.75 mm., said composition having been cured in the presence of heat and a vinyl polymerization catalyst.

References Cited in the file of this patent

UNITED STATES PATENTS

| | | |
|---|---|---|
| 2,683,131 | Cass | July 6, 1954 |
| 2,717,216 | Arone | Sept. 6, 1955 |